United States Patent
Kim et al.

(10) Patent No.: US 10,298,722 B2
(45) Date of Patent: May 21, 2019

(54) APPARATUS AND METHOD FOR ADJUSTING DRIVING POSITION OF DRIVER

(71) Applicant: Hyundai Motor Company, Seoul (KR)

(72) Inventors: Jin Kim, Gyeonggo-do (KR); Dong Youl Lee, Seoul (KR); Chul Min Kim, Gyeonggi-do (KR); Young Su Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 11 days.

(21) Appl. No.: 15/176,995

(22) Filed: Jun. 8, 2016

(65) Prior Publication Data

US 2017/0129366 A1    May 11, 2017

(30) Foreign Application Priority Data

Nov. 11, 2015  (KR) .................. 10-2015-0158348

(51) Int. Cl.
| | | |
|---|---|---|
| *H04W 4/80* | (2018.01) | |
| *H04L 29/06* | (2006.01) | |
| *B60K 35/00* | (2006.01) | |
| *B60N 2/02* | (2006.01) | |
| *B62D 1/181* | (2006.01) | |

(52) U.S. Cl.
CPC ............. *H04L 67/42* (2013.01); *B60K 35/00* (2013.01); *B60N 2/0248* (2013.01); *B62D 1/181* (2013.01); *H04W 4/80* (2018.02); *B60K 2350/2052* (2013.01); *B60K 2350/2069* (2013.01); *B60K 2350/352* (2013.01)

(58) Field of Classification Search
CPC .... B60N 2/02; B60K 35/00; B60K 2350/352; B60R 1/006; B62D 1/04; E05B 81/70; H04L 67/42; H04W 4/008
USPC ........................................................ 701/49
See application file for complete search history.

(56) References Cited

U.S. PATENT DOCUMENTS

| | | | |
|---|---|---|---|
| 6,718,240 B1 * | 4/2004 | Suda ................ | B60N 2/0248 318/480 |
| 7,164,117 B2 * | 1/2007 | Breed .............. | B60R 21/01516 250/208.1 |
| 7,430,467 B2 * | 9/2008 | Borke ............. | B60N 2/0248 177/1 |

(Continued)

FOREIGN PATENT DOCUMENTS

| | | |
|---|---|---|
| JP | 2005-246997 A | 9/2005 |
| KR | 2003-0049786 A | 6/2003 |

(Continued)

*Primary Examiner* — Anne M Antonucci
*Assistant Examiner* — James E Stroud
(74) *Attorney, Agent, or Firm* — Mintz Levin Cohn Ferris Glovsky and Popeo, P.C.; Peter F. Corless

(57) ABSTRACT

An apparatus for adjusting a driving position of a driver of a vehicle includes: a communication module performing wireless communication with an external terminal of a user; a door module sensing an opening or closing of a door of the vehicle; and a controller receiving, when the door of the vehicle is opened, user information identifying the user from the external terminal via the communication module, retrieving driving position adjustment information corresponding to the user information from a big data server, and adjusting the driving position based on the driving position adjustment information.

16 Claims, 4 Drawing Sheets

(56) References Cited

U.S. PATENT DOCUMENTS

| | | | |
|---|---|---|---|
| 7,734,396 B2 | 6/2010 | Hattori et al. | |
| 8,848,608 B1 * | 9/2014 | Addepalli | H04W 4/046 370/328 |
| 9,442,888 B2 * | 9/2016 | Stanfield | G08G 1/20 |
| 9,544,742 B2 * | 1/2017 | Van Wiemeersch | H04W 4/046 |
| 10,204,282 B2 * | 2/2019 | Wilbert | G06K 9/325 |
| 2007/0108267 A1 * | 5/2007 | Jonsson | G07D 3/14 235/379 |
| 2009/0284359 A1 * | 11/2009 | Huang | B60R 25/04 340/426.1 |
| 2013/0197674 A1 * | 8/2013 | Lowry | B60W 50/08 700/19 |
| 2013/0346168 A1 * | 12/2013 | Zhou | G06F 1/163 705/14.4 |
| 2015/0210287 A1 * | 7/2015 | Penilla | B60W 40/08 701/49 |
| 2015/0271201 A1 * | 9/2015 | Ruvio | H04L 63/1408 726/23 |
| 2016/0235239 A1 * | 8/2016 | Patadia | A47J 44/00 |
| 2017/0045890 A1 * | 2/2017 | Gurin | G06Q 10/0836 |

FOREIGN PATENT DOCUMENTS

| | | |
|---|---|---|
| KR | 2004-0095128 A | 11/2004 |
| KR | 10-0488739 B1 | 5/2005 |
| KR | 10-0867737 B1 | 11/2008 |
| KR | 10-1492062 B1 | 2/2015 |
| KR | 10-1558762 B1 | 10/2015 |

* cited by examiner

APPARATUS AND METHOD FOR ADJUSTING DRIVING POSITION OF DRIVER

CROSS-REFERENCE TO RELATED APPLICATION

This application claims the benefit of and priority to Korean Patent Application No. 10-2015-0158348, filed on Nov. 11, 2015, in the Korean Intellectual Property Office, the disclosure of which is incorporated herein in its entirety by reference.

TECHNICAL FIELD

The present disclosure relates generally to an apparatus and method for adjusting a driving position of a driver and, more particularly, to an apparatus and method for adjusting a driving position of a driver capable of managing driving position adjustment information of each user, as big data, and adjusting an optimal driving position for a user by utilizing the big data when the user enters the vehicle. ostentatious

BACKGROUND

An integrated memory system (IMS) is a system for storing an optimal driving position appropriate for a driver of a vehicle and automatically adjusting a driving position as stored when a driver enters the vehicle. The IMS also allows the driver to adjust various convenience devices at a time by simply operating a button once the driver stores a state adjusted by the driver. For instance, when the driver sits on the driver's seat and presses a button, the IMS can implement a seat position, a height and a depth of steering, an angle of a side mirror, cluster brightness, a head-up display position and brightness, and the like, all of which have been adjusted to fit a body type of the driver.

The conventional IMS, however, has some restrictions. First, the driving position information to be set is limited to two or three pieces of information due to a restriction of a hardware installation space. Second, a user should directly set a driving position suitable for him. For example, if a single vehicle is used by several family members, e.g., father, mother, son, and daughter, the four members are highly likely to be different in body type, requiring different set values. In this case, the number of pieces of driving position information required to be set is limited. Also, if a user does not remember a button set by the user, the user may need to determine a driving position set by the user by operating all the buttons, creating an inconvenience.

In another example, in the case of carpooling, each person involved in carpooling uses different vehicles, and the drivers and vehicles are frequently changed. In this case, the conventional IMS has difficulty dealing with these situations.

SUMMARY

The present disclosure has been made to solve the above-mentioned problems occurring in the related art while advantages achieved by the related art are maintained intact.

An aspect of the present disclosure provides an apparatus and method for adjusting a driving position of a driver, capable of managing driving position adjustment information of each user, as big data, and adjusting an optimal driving position for a user by utilizing the big data when the user gets in a vehicle.

According to embodiments of the present disclosure, an apparatus for adjusting a driving position of a driver of a vehicle includes: a communication module performing wireless communication with an external terminal of a user; a door module sensing an opening or closing of a door of the vehicle; and a controller receiving, when the door of the vehicle is opened, user information identifying the user from the external terminal via the communication module, retrieving driving position adjustment information corresponding to the user information from a big data server, and adjusting the driving position based on the driving position adjustment information.

The communication module may perform wireless communication with the external terminal using any one of communication technologies among Bluetooth, near field communication (NFC), radio frequency identification (RFID), infrared data association (IrDA), and ZigBee.

The user information may include identification information of the external terminal and body type information of the user.

When the external terminal first attempts at communication connection with the communication module, the controller may sense an occupancy position of the user, receive the user information from the external terminal via the communication module, register the user information together with driving position adjustment information corresponding to the user information in the big data server, and manage the driving position adjustment information.

The big data server may search for standard driving position adjustment information based on the user information.

When the opening of a door is sensed by the door module, the controller may determine an occupancy position of the user using door information, seat pressure information, seat belt information, and external terminal movement information.

The driving position adjustment information may include two or more of: outside mirror adjustment information, seat adjustment information, steering wheel adjustment information, head-up display adjustment information, and cluster adjustment information.

The controller may adjust at least one of: a reflection angle of an outside mirror via an outside mirror module, a seat position via a power seat module, a height or a depth of a steering wheel via a steering column module, and a brightness of a display via an output module, based on the driving position adjustment information.

Furthermore, according to embodiments of the present disclosure, a method for adjusting a driving position of a driver of a vehicle includes: sensing that a user is present in the vehicle when an opening of a door of the vehicle is sensed; receiving user information identifying the user from an external terminal of the user in wireless communication with a communication module; retrieving driving position adjustment information corresponding to the user information from a big data server; and adjusting the driving position based on the driving position adjustment information.

The method may further include determining an occupancy position of the user using door information, seat pressure and safety belt information, and external terminal movement information.

The method may further include searching for the driving position adjustment information in the big data server using vehicle identification information and identification information of the external terminal.

The retrieving of the driving position adjustment information may include: determining whether the external terminal is present within the vehicle and paired with the communication module; when the paired external terminal is present within the vehicle, receiving the user information from the external terminal; and searching for standard driving position adjustment information corresponding to the user based on the user information in the big data server.

The user information may include body information including a height and a weight of the user.

The determining of whether the paired external terminal is present in the vehicle may include: when the paired external terminal is not present within the vehicle, searching for an unpaired external terminal uniformly maintaining a signal strength greater than or equal to a reference value, while the vehicle is driving for a period of time greater than or equal to a predetermined period of time; and registering the unpaired external terminal as a valid device.

Furthermore, according to embodiments of the present disclosure, a non-transitory computer readable medium contains program instructions that: sense that a user is present in the vehicle when an opening of a door of the vehicle is sensed; receive user information identifying the user from an external terminal of the user in wireless communication with a communication module; retrieve driving position adjustment information corresponding to the user information from a big data server; and adjust the driving position based on the driving position adjustment information.

BRIEF DESCRIPTION OF THE DRAWINGS

The above and other objects, features and advantages of the present disclosure will be more apparent from the following detailed description taken in conjunction with the accompanying drawings.

Figure 1:
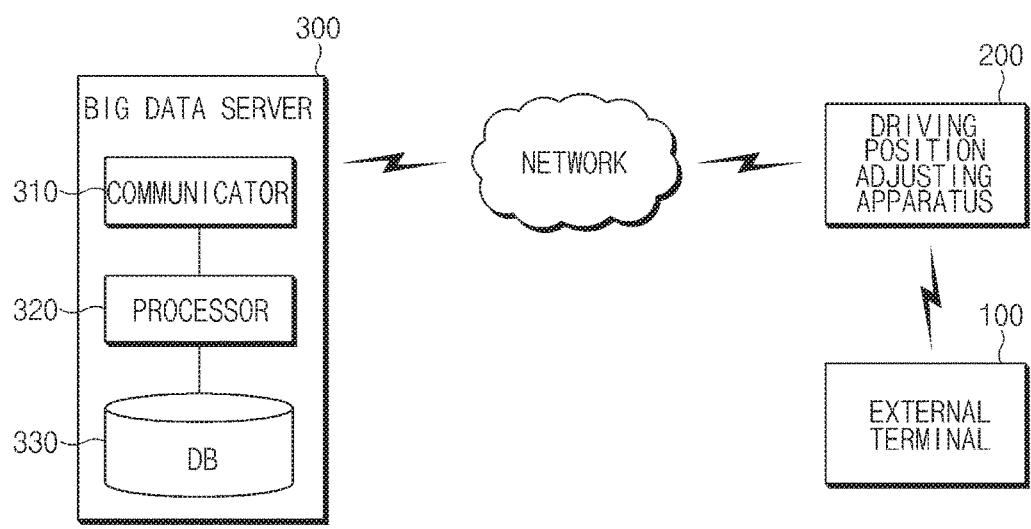
FIG. 1 is a view illustrating a configuration of a system for adjusting a driving position of a driver according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, exemplary embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The preset disclosure relates to an apparatus for managing body type information and driving position adjustment information of each user as big data and automatically adjusting a driving position suitable for a user who gets in a vehicle, by using the big data.

FIG. 1 is a view illustrating a configuration of a system for adjusting a driving position of a driver according to embodiments of the present disclosure.

As illustrated in FIG. 1, the system for adjusting a driving position includes an external terminal 100, an apparatus 200 for adjusting a driving position of a driver (hereinafter referred to as a "driving position adjusting apparatus 200"), and a big data server 300.

The external terminal 100 stores and manages identification information and user information (i.e., occupant information) in a storage. The identification information may be a device ID of a communication module (not shown) performing wireless communication or a device ID of the external terminal 100. The user information includes body information such as a height and a weight of a user (e.g., a driver or an occupant), age, occupation, and gender. The external terminal 100 may obtain the user information using an image sensor and/or an ultrasonic sensor or through a user input.

The external terminal 100 has a communication module (not shown) for short range communication with the driving position adjusting apparatus 200. The external terminal 100 may use any one of communication technologies such as Bluetooth, near field communication (NFC), radio frequency identification (RFID), infrared data association (IrDA), ultra-wideband (UWB), and ZigBee.

The external terminal 100 senses a movement of the terminal (indicating a movement of the user) using a geomagnetic sensor and an accelerometer. The external terminal 100 transmits movement information to the driving position adjusting apparatus 200 using wireless communication. The external terminal 100 is implemented as a computing device which is portable by a user such as a smartphone, a wearable device, a tablet computer, or the like.

The driving position adjusting apparatus 200 is installed within a vehicle and stores driving position adjustment information of each user who gets in the corresponding vehicle in the big data server 300.

When a user gets in the vehicle, the driving position adjusting apparatus 200 receives driving position adjustment information corresponding to the user from the big data server 300 and sets the driving position adjustment information. Here, the driving position adjustment information includes, for instance, seat adjustment information, outside mirror adjustment information, indie mirror adjustment information, steering wheel adjustment information, and display adjustment information.

The big data server 300 stores and manages driving position adjustment information of each user and standard driving position adjustment information. The big data server 300 includes a communicator 310, a processor 320, and a database (DB) 330.

The communicator 310 performs data communication with the driving position adjusting apparatus 200 via a network. Here, as the network, a broadcasting communication network, a mobile communication network, a wireless Internet, or the like may be used.

The processor 320 stores the driving position adjustment information of the user in the DB 330 and manages the stored information according to a request from the driving position adjusting apparatus 200. Also, the processor 320 calculates standard driving position adjustment information appropriate for the user based on user information provided from the driving position adjusting apparatus 200. In other words, the processor 320 calculates driving position adjustment information corresponding to a user on the basis of body information of the user.

The DB 330 stores driving position adjustment information of each user and standard driving position adjustment information. The DB 330 stores vehicle identification information (vehicle ID), an occupancy position of a user (e.g., a driver's seat, a passenger seat, a back seat of the driver's seat, and a back seat of the passenger seat), identification information of the external terminal 100 (device ID), user information, and driving position adjustment information.

Figure 2:
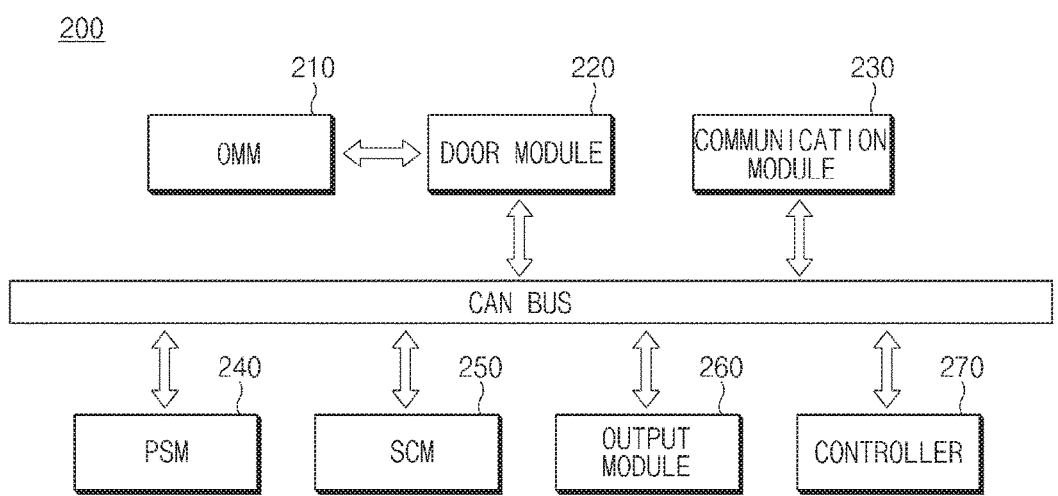
FIG. 2 is a block diagram of an apparatus for adjusting a driving position of a driver illustrated in FIG. 1.

FIG. 2 is a block diagram of an apparatus for adjusting a driving position of a driver illustrated in FIG. 1.

As shown in FIG. 2, the driving position adjusting apparatus 200 includes an outside mirror module (OMM) 210, a door module 220, a communication module 230, a power seat module (PSM) 240, a steering column module (SCM) 250, an output module 260, and a controller 270.

The OMM 210 folds or unfolds an outside mirror. The OMM 210 adjusts a reflection angle of the outside mirror up and down and left and right on the basis of the driving position adjustment information.

The door module 220 is connected to the OMM 210 via a local interconnection network (LIN) or may be directly connected by a cable. The door module 220 is connected to the communication module 230, the PSM 240, the SCM 250, and the output module 260 through a controller area network (CAN) bus.

The door module 220 senses opening or closing of a door. The door module 220 transmits driving position adjustment information to the OMM 210, the PSM 240, the SCM 250, and the output module 260.

The communication module 230 performs wireless communication with the external terminal 100. The communication module 230 measures signal strength of the external terminal 100. For example, the communication module 230 measures received signal strength indication (RSSI).

The communication module 230 receives terminal information transmitted from the external terminal 100. The terminal information includes a device ID of the communication module 230, user information (e.g., height, weight, age, gender, occupation, etc.), and external terminal movement information (e.g., data measured by a geomagnetic sensor and an accelerometer installed in the external terminal indicating movement of the external terminal).

The communication module 230 is a communication means installed in an internal vehicle device such as a telematics unit, a vehicle audio system, or an audio video navigation (AVN). The communication module 230 may perform wireless communication using any one of communication technologies such as Bluetooth, near field communication (NFC), radio frequency identification (RFID), infrared data association (IrDA), ultra-wideband (UWB), ZigBee, and the like.

The PSM 240 senses whether a user occupies each seat in a vehicle or whether a user wears a seat belt by using a pressure sensor or a capacitance type sensor.

Also, the PSM 240 adjusts a seat position, a seat height, a tilt of a back of a seat and a cushion, a length of a front portion of a cushion, and a position and an angle of a headrest according to driving position adjustment information.

The SCM 250 adjusts a position and a depth of a steering wheel according to the driving position adjustment information.

The output module 260 may include a head-up display (HUD) and a cluster. The output module 260 adjusts a position and brightness of the HUD and brightness of the cluster on the basis of the driving position adjustment information.

The controller 270 may determine a position of the external terminal 100 within the vehicle using vehicle interior information such as door information, occupancy information of each seat, and seat belt information, and signal strength provided from the door module 220, the PSM 240, and the communication module 230, and external terminal information such as terminal information, user information, and terminal movement information transmitted from the external terminal 100.

The controller 270 determines whether a user occupies a vehicle seat in the vehicle and receives driving position adjustment information corresponding to an occupant from the big data server 300. The controller 270 adjusts a seat, an outside mirror, an inside mirror, a heads up display (HUD), and a cluster on the basis of the driving position adjustment information. After adjusting the seat, the outside mirror, the inside mirror, the HUD, and the cluster, the controller 270 stores current state information (driving position setting information). That is, the OMM 210, the PSM 240, and the SCM 250 store position information in an internal memory, and the output module 260 stores position and brightness information or brightness information in the internal memory.

For example, in a case in which an occupant occupies a back seat of a driver's seat, the controller 270 receives seat adjustment information regarding the occupant from the big data server 300 and adjusts the seat.

Figure 3:
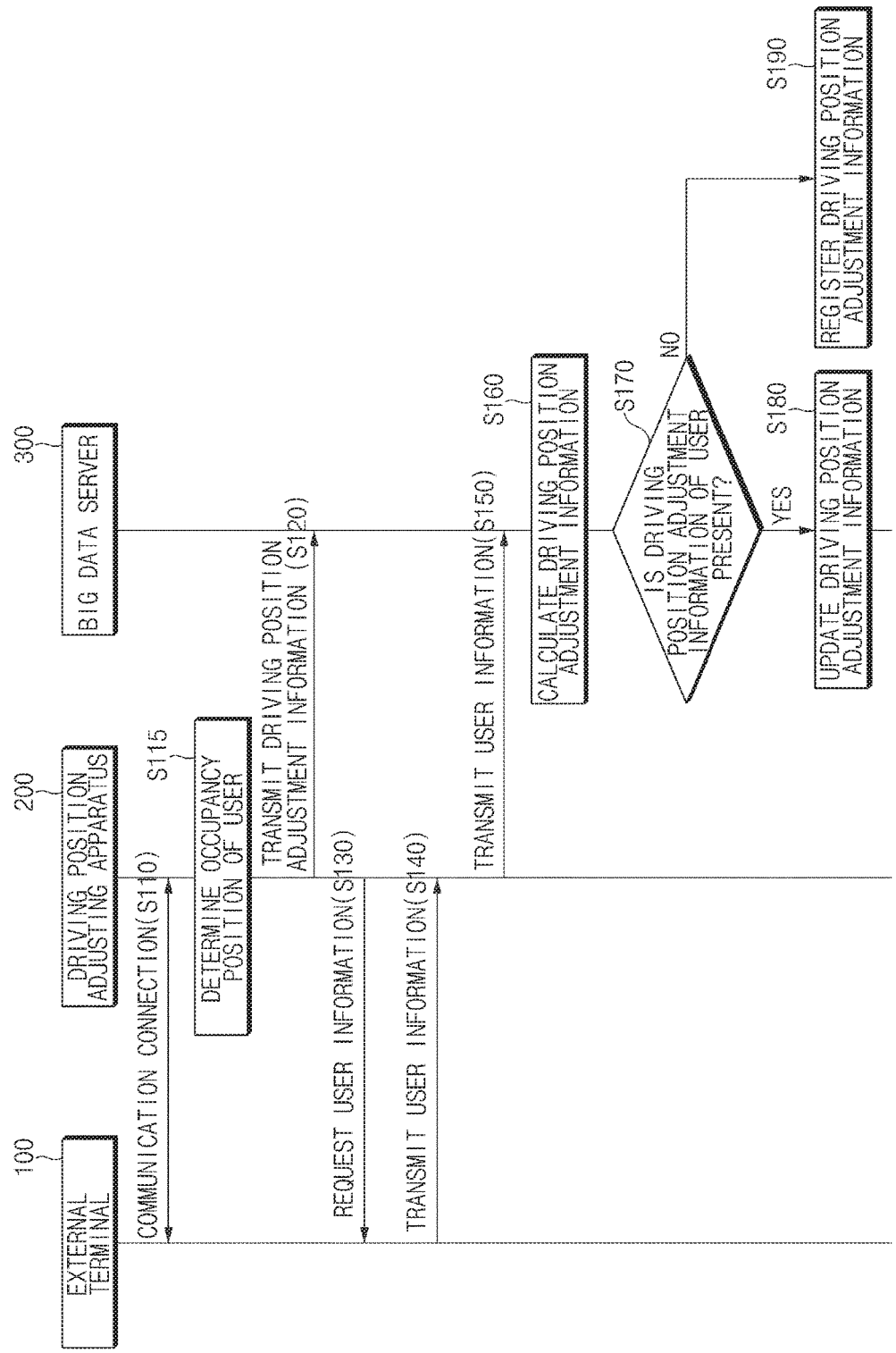
FIG. 3 is a flow chart illustrating a process of generating driving position adjustment information for each user as big data according to embodiments of the present disclosure.

FIG. 3 is a flow chart illustrating a process of generating driving position adjustment information for each user as big data according to embodiments of the present disclosure.

The driving position adjusting apparatus 200 initially sets communication connection with the external terminal 100 in operation S110. For example, in a case in which the external terminal 100 initially requests Bluetooth pairing, the driving position adjusting apparatus 200 performs pairing with the external terminal 100.

The driving position adjusting apparatus 200 determines an occupancy position of a user in operation S115. A method for determining an occupancy position of a user includes a method using signal strength and a method using a position sensor.

First, according to the method for determining a user occupancy position using signal strength, the driving position adjusting apparatus 200 searches for a valid device uniformly maintaining signal strength equal to or greater than a reference value within a short range wireless communication area. Here, the valid device refers to an already paired external terminal or an external terminal directly paired after a user gets in the vehicle. When an unpaired external terminal which uniformly maintains signal strength equal to or greater than the reference value while the vehicle is driving for a period of time equal to or greater than a predetermined period of time (or distance) is detected, the driving position adjusting apparatus 200 searches for a device ID of the corresponding external terminal and registers the external terminal as a valid device.

The driving position adjusting apparatus 200 detects occupancy information of the user on the basis of the measured signal strength of the external terminal 100.

Referring to the method using a position sensor, the driving position adjusting apparatus 200 receives movement information of a device from the external terminal 100 and determines an occupancy position of a user. In other words, the external terminal 100 measures movement information of the external terminal 100 using a sensor such as a geomagnetic sensor and an accelerometer installed therein and transmits the measured movement information to the driving position adjusting apparatus 200.

The driving position adjusting apparatus 200 transmits currently set driving position adjustment information (driving position setting information) of the vehicle to the big data server 300 in operation S120. The driving position adjusting apparatus 200 also transmits vehicle identification information and the occupancy position together with the currently set driving position adjustment information (e.g., seat adjustment information) to the big data server 300. Here, the vehicle identification information may be a vehicle identification number or a vehicle ID.

The driving position adjusting apparatus 200 requests user information from the paired external terminal 100 in operation S130.

The external terminal 100 transmits user information according to a request from the driving position adjusting apparatus 200 in operation S140. The external terminal 100 transmits identification information (user identification information) of the external terminal 100 together with the user information.

The driving position adjusting apparatus 200 transmits the user information received from the external terminal 100 to the big data server 300 in operation S150. The driving position adjusting apparatus 200 transmits vehicle interior information and external terminal identification information together. The vehicle interior information includes vehicle identification information and occupancy position information. The big data server 300 stores the user information, the user occupancy position information, and the driving position adjustment information received from the driving position adjusting apparatus 200. The big data server 300 discriminately stores the vehicle identification information, the occupancy position information, and the identification information of the external terminal 100.

The big data server 300 calculates standard driving position adjustment information according to the vehicle identification information and a seat position on the basis of user information in operation S160. That is, the big data server 300 calculates standard driving position adjustment information on the basis of body type information of the user.

The big data server 300 determines whether driving position adjustment information set by the user is present in operation S170. That is, the big data server 300 determines whether driving position adjustment information set by the user has also been received when the user information is received in operation S150.

When the driving position adjustment information set by the user is present, the big data server 300 updates the calculated driving position adjustment information with the driving position adjustment information set by the user in operation S180.

If, however, driving position adjustment information set by the user is not present, the big data server 300 newly registers the calculated standard driving position adjustment information in the DB 330.

Figure 4:
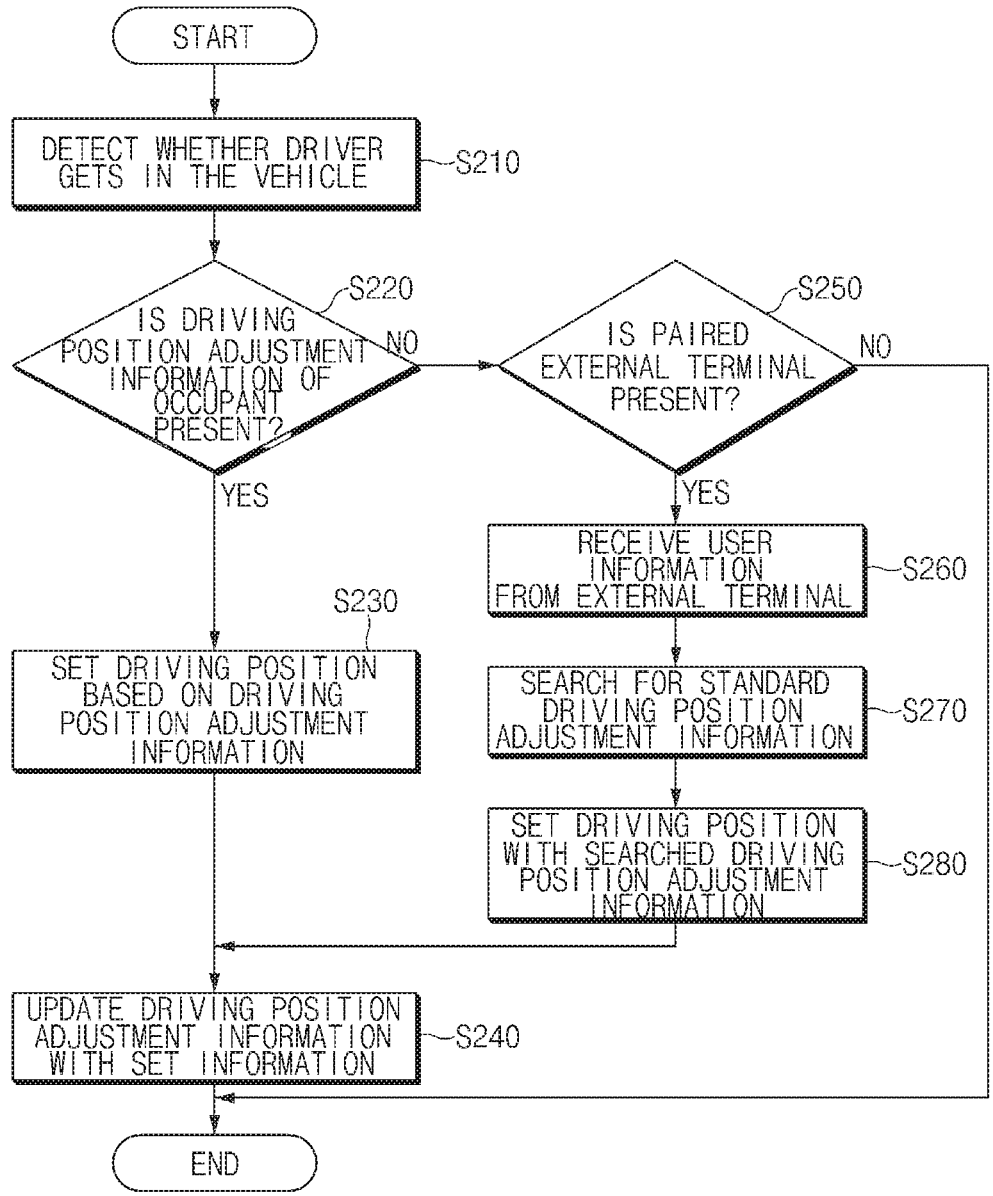
FIG. 4 is a flow chart illustrating a method for adjusting a driving position of a driver according to embodiments of the present disclosure.

FIG. 4 is a flow chart illustrating a method for adjusting a driving position of a driver according to embodiments of the present disclosure. A scenario in which a driver gets in a vehicle will be described as an example for demonstration purposes below.

When a door of the vehicle is opened, the controller 270 of the driving position adjusting apparatus 200 detects whether a user (e.g., driver or passenger) gets in the vehicle (S210). In other words, when opening of the door is sensed through the door module 220, the controller 270 determines an occupancy position of an occupant through the PWM 240 and the communication module 230. The controller 270 may determine pressure of each seat and whether the occupant wears a seat belt through the PSM 240, and measure signal strength of each external terminal 100 through the communication module 230. Here, the controller 270 searches for an external terminal 100 uniformly maintaining signal strength equal to or greater than threshold signal strength. Also, the controller 270 may identify an occupancy position of the user upon receiving movement information transmitted from the external terminal 100 through the communication module 230.

The controller 270 determines whether driving position adjustment information of the user is present in the big data server 300 in operation S220. Here, the controller 270 determines whether the driving position adjustment information of the user is present in the big data server 300 using vehicle identification information and identification information of the external terminal 100.

When the driving position adjustment information of the user is present in the big data server 300, the controller 270 may receive the driving position adjustment information of the corresponding occupant from the big data server 300 and set a driving position in operation S230. The controller 270 transmits the driving position adjustment information to each convenience device through the door module 220 to adjust a driving position. Here, the convenience device includes the OMM 210, the PSM 240, the SCM 250, and the output module 260.

The controller 270 updates driving position adjustment information of the corresponding driver stored in the big data server 300 with set driving position information in operation S240.

Meanwhile, when the driving position adjustment information of the occupant is not present in the big data server 300 in operation S220, the controller 270 determines whether a paired external terminal 100 is present in operation S250.

When the paired external terminal 100 is present, the controller 270 receives user information from the paired external terminal 100 in operation S260. Here, the controller 270 may receive identification information of the external terminal 100 together with the user information.

The controller 270 searches the big data server 300 for standard driving position adjustment information based on the user information in operation S270. The big data server 300 retrieves standard driving position adjustment information appropriate for the user from the DB 330 on the basis of body type information of the user included in the user information and provides the searched standard driving position adjustment information to the controller 270.

The controller 270 sets a driving position on the basis of the searched standard driving position adjustment information in operation S280. Thereafter, the controller 270 performs operation S240.

Meanwhile, when the paired external terminal 100 is not present in operation S250, the controller 270 terminates driving position adjustment. In a case in which the paired external terminal 100 is not present, the controller 270 searches for an unpaired external terminal maintaining signal strength equal to or higher than a reference value for a predetermined period of time or while driving on a road, and registers the searched terminal as a valid device. The controller 270 may perform pairing on the searched terminal.

As described above, according to embodiments of the present disclosure, the driving position adjusting apparatus manages driving position adjustment information of each user as big data, and when a user gets in a vehicle, the driving position adjusting apparatus may automatically adjust an optimal driving position appropriate for the user by utilizing the big data.

Also, even though the user does not set a driving position separately, a driving position fitting the user's body may be adjusted by utilizing the big data. In other words, in the present disclosure, a driving position appropriate for the user may be derived on the basis of body type information and driving position adjustment information of a different user.

Also, even when the user changes a vehicle, a driving position appropriate for the user may be automatically adjusted. In this manner, the present disclosure provides additional ease and convenience for the user.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for adjusting a driving position of a driver of a vehicle, the apparatus comprising:
a communication module performing wireless communication with an external terminal of a user;
a door module sensing an opening or closing of a door of the vehicle; and
a controller receiving, when the door of the vehicle is opened, user information identifying the user, including body information of the user, from the external terminal via the communication module, retrieving standard driving position adjustment information from a big data server, wherein the standard driving position adjustment information is calculated by the big data server based on at least one of external terminal identification information, vehicle identification information, occupancy position information, and the body information of the user, and adjusting the driving position based on the standard driving position adjustment information.

2. The apparatus according to claim 1, wherein the communication module performs wireless communication with the external terminal using any one of communication technologies among Bluetooth, near field communication (NFC), radio frequency identification (RFID), infrared data association (IrDA), and ZigBee.

3. The driving position adjusting apparatus according to claim 1, wherein the user information includes identification information of the external terminal.

4. The apparatus according to claim 1, wherein when the external terminal first attempts at communication connection with the communication module, the controller senses an occupancy position of the user, receives the user information from the external terminal via the communication module, registers the user information together with driving position adjustment information corresponding to the user information in the big data server, and manages the driving position adjustment information.

5. The apparatus according to claim 1, wherein the big data server calculates the standard driving position adjustment information based on the user information.

6. The apparatus according to claim 1, wherein when the opening of the door is sensed by the door module, the controller determines an occupancy position of the user using door information, seat pressure information, seat belt information, and external terminal movement information.

7. The apparatus according to claim 1, wherein the driving position adjustment information includes two or more of: outside mirror adjustment information, seat adjustment information, steering wheel adjustment information, head-up display adjustment information, and cluster adjustment information.

8. The apparatus according to claim 1, wherein the controller adjusts at least one of: a reflection angle of an outside mirror via an outside mirror module, a seat position via a power seat module, a height or a depth of a steering wheel via a steering column module, and a brightness of a display via an output module, based on the driving position adjustment information.

9. A method for adjusting a driving position of a driver of a vehicle, the method comprising:
- sensing that a user is present in the vehicle when an opening of a door of the vehicle is sensed;
- receiving user information identifying the user, including body information of the user, from an external terminal of the user in wireless communication with a communication module;
- retrieving standard driving position adjustment information from a big data server, wherein the standard driving position adjustment information is calculated by the big data server based on at least one of external terminal identification information, vehicle identification information, occupancy position information, and the body information of the user; and
- adjusting the driving position based on the standard driving position adjustment information.

10. The method according to claim 9, further comprising determining an occupancy position of the user using door information, seat pressure and safety belt information, and external terminal movement information.

11. The method according to claim 9, further comprising searching for the driving position adjustment information in the big data server using vehicle identification information and identification information of the external terminal.

12. The method according to claim 9, wherein the retrieving of the driving position adjustment information comprises:
- determining whether the external terminal is present within the vehicle and paired with the communication module;
- when the paired external terminal is present within the vehicle, receiving the user information from the external terminal; and
- calculating the standard driving position adjustment information corresponding to the user based on the user information in the big data server.

13. The method according to claim 12, wherein the body information includes a height and a weight of the user.

14. The method according to claim 12, wherein the determining of whether the paired external terminal is present in the vehicle comprises:
- when the paired external terminal is not present within the vehicle, searching for an unpaired external terminal uniformly maintaining a signal strength greater than or equal to a reference value, while the vehicle is driving for a period of time greater than or equal to a predetermined period of time; and
- registering the unpaired external terminal as a valid device.

15. A non-transitory computer readable medium containing program instructions for adjusting a driving position of a driver of a vehicle, the computer readable medium comprising program instructions that:
- sense that a user is present in the vehicle when an opening of a door of the vehicle is sensed;
- receive user information identifying the user, including body information of the user, from an external terminal of the user in wireless communication with a communication module;
- retrieve standard driving position adjustment information from a big data server, wherein the standard driving position adjustment information is calculated by the big data server based on at least one of external terminal identification information, vehicle identification information, occupancy position information, and the body information of the user; and
- adjust the driving position based on the standard driving position adjustment information.

16. An apparatus for adjusting a driving position of a driver of a vehicle, the apparatus comprising:
- a communication module performing wireless communication with an external terminal of a user;
- a door module sensing an opening or closing of a door of the vehicle; and
- a controller receiving, when the door of the vehicle is opened, user information identifying the user, including body information of the user, from the external terminal via the communication module, retrieving standard driving position adjustment information from a big data server, wherein the standard driving position adjustment information is calculated by the big data server based on at least one of external terminal identification information, vehicle identification information, occupancy position information, and the body information of the user, and adjusting the driving position based on the standard driving position adjustment information,
- wherein the controller adjusts at least one of: a reflection angle of an outside mirror via an outside mirror module, a seat position via a power seat module, a height or a depth of a steering wheel via a steering column module, and a brightness of a display via an output module, based on the standard driving position adjustment information.

* * * * *